United States Patent [19]
Bors et al.

[11] Patent Number: 5,484,849
[45] Date of Patent: Jan. 16, 1996

[54] AIR CURING POLYMER COMPOSITION

[75] Inventors: Daniel A. Bors, Warminster; Alvin C. Lavoie, Lansdale; William D. Emmons, Huntingdon Valley, all of Pa.

[73] Assignee: Rohm and Haas Company, Philadelphia, Pa.

[21] Appl. No.: 367,482

[22] Filed: Dec. 30, 1994

Related U.S. Application Data

[63] Continuation of Ser. No. 114,117, Aug. 30, 1993, abandoned, which is a continuation of Ser. No. 241,031, Mar. 19, 1993, abandoned, which is a continuation of Ser. No. 632,302, Dec. 21, 1990, abandoned.

[51] Int. Cl.$^6$ ..................................... C08L 67/08
[52] U.S. Cl. ................. 525/167.5; 524/398; 524/435; 524/502; 524/513; 524/517; 524/522; 524/523; 524/529; 524/533; 524/534; 524/539; 525/170; 525/207; 525/221; 525/245; 525/300; 525/301; 525/301.5; 525/308; 525/370; 525/371; 525/378; 525/379; 525/380; 525/386
[58] Field of Search ........................... 524/398, 435, 524/502, 513, 517, 522, 523, 529, 533, 534, 539; 525/167.5, 170, 207, 221, 245, 300, 301, 308, 370, 371, 378, 379, 380, 386, 301.5

[56] References Cited

U.S. PATENT DOCUMENTS

| | | | |
|---|---|---|---|
| 3,551,479 | 12/1970 | Emmons | 526/287 |
| 3,554,987 | 1/1971 | Smith | 526/287 |
| 3,644,316 | 2/1972 | Marx et al. | 526/323.1 |
| 4,210,565 | 7/1980 | Emmons | 524/560 |
| 4,408,018 | 10/1983 | Bartman | 525/300 |
| 4,906,684 | 3/1990 | Say | 524/548 |
| 4,988,762 | 1/1991 | Overbeck et al. | 524/839 |

FOREIGN PATENT DOCUMENTS 1185216  3/1970  Germany.

OTHER PUBLICATIONS

Spoor, Die Angewandte Makromolekulare Chemie 4/5 38, 160–163 (1968), Reactive polyacrylates For Protective Coatings.

Primary Examiner—Judy M. Reddick
Attorney, Agent, or Firm—David T. Banchik

[57] ABSTRACT

An air curing polymer composition is disclosed which contains acetoacetate functional polymer and an autoxidizable material. The composition cures on exposure to oxygen. One pack stable ambient curing compositions and a method of stabilizing acetoacetate functional groups to prevent hydrolysis are also disclosed.

17 Claims, No Drawings

AIR CURING POLYMER COMPOSITION

This application is a continuation of application Ser. No. 08/114,117, filed Aug. 30, 1993, now abandoned, which is a continuation of application Ser. No. 24,031, filed Mar. 1, 1993, now abandoned, which is a continuation of application Ser. No. 632,302 filed Dec. 21, 1990, now abandoned,

BACKGROUND OF THE INVENTION

This invention relates to the improvement of properties of film forming vinyl polymers. These polymers have many uses, particularly in coatings, sealants, adhesive, and saturant applications and are most useful as solutions or dispersions in water or water-cosolvent mixtures. Films derived from these polymers are greatly improved if they can be crosslinked after film formation. Properties which are generally enhanced by crosslinking include solvent resistance, dirt pickup, adhesion, print and block, mar resistance, tensile properties, etc.

The prior art describes the potential utility of films, derived from vinyl polymers containing pendant acetoacetate groups when crosslinked by exposure to air preferably in the presence of cobalt salts. [Spoor, Die Angewandte Makromolekulare Chemie 38, 160 (1968) 1. However, this technology is inadequate because the free radical flux generated by the metal salt is insufficient to cure the polymeric films fast enough to be practical at room temperature.

OBJECTS OF THE INVENTION

An object of the invention is to provide a crosslinking mechanism which is operative after film formation is complete; otherwise the film formation process from an aqueous dispersion or even a solvent will be compromised, the film will be weak and porous, and the protective or adhesive functions of the polymeric film will be severely impaired. Frequently, heat can be used to assist crosslinking after film formation is complete; however, in many cases, heat is not available so the crosslinking mechanism is desirably triggered under ambient conditions after film formation is complete. Sometimes this can be accomplished by mixing two reactive components together prior to film formation; however, these two component systems usually have a short pot life and are awkward and impractical to use in many applications.

SUMMARY OF THE INVENTION

The invention provides an ambient curing, self-crosslinking technology for film forming emulsion, dispersion, or solution polymers which meets the above requirements, occurs after film formation, and does not impair the quality of film formation. The invention relates to a film forming composition comprising a vinyl polymer having pendant acetoacetate functionality which is cured by a free radical flux generated after film formation is largely complete. In most cases this is based on an autoxidizeable component which provides a source of free radicals to cure and crosslink the acetoacetate functionality upon exposure to oxygen of the air. The autoxidizeable component can be built into the vinyl polymer or it can be added as a separate additive. Alternatively, the free radical source can be generated by a two component redox system involving an oxidizing agent, such as a peroxide or hydroperoxide, and a metal co-reactant. This latter system does not depend on the autoxidation process for its efficacy.

DETAILED DESCRIPTION OF THE INVENTION

In its preferred embodiment this invention results in a one package ambient curing film forming polymer. The film formation process is well known in the coatings industry and is described in detail by J. Bentley ("Organic Film Formers" in Paint and Surface Coatings., R. Lambourne (Editor), John Wiley and Sons, New York, N.Y., 1987). In some cases, however, this technology may be useful as a two package system, preferably one with long pot life at ambient temperatures. When desirable, heat may be used for acceleration of cure.

The preferred polymers for use in this invention are vinyl polymers with pendant acetoacetate groups. The term "pendant" is used in the specification to mean "attached to the polymer backbone and available for further reaction." Pendant should not be read in the strict sense which would exclude the attachment of such groups at the termini of a polymer chain. Thus, polymer having acetoacetate functionality introduced on the chain end by an acetoacetate functional mercaptan as taught in U.S. Pat. No. 4,960,924 would be useful in this invention. Generally, the pendant acetoacetate groups are attached to the polymer backbone via an organic divalent radical $R^1$ which in turn is attached to the acetoacetate moiety or by a trivalent organic radical $R^2$ bearing two acetoacetate groups.

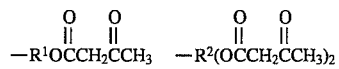

The acetoacetate functional polymers can be prepared by means known in the art. A preferred method is polymerization through incorporation which includes an acetoacetate functional monomer. A preferred monomer is acetoacetoxyethyl methacrylate which is conveniently referred to throughout this specification as AAEM, shown below.

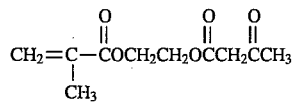

Examples of other monomers useful for introduction of acetoacetate functionality are acetoacetoxyethyl acrylate, acetoacetoxypropyl methacrylate, allyl acetoacetate, acetoacetoxybutyl methacrylate, 2,3-di(acetoacetoxy)propyl methacrylate and the like. In general, any polymerizable hydroxy functional monomer can be converted to the corresponding acetoacetate by reaction with diketene or other suitable acetoacetylating agent (See e.g., Comparison of Methods for the Preparation of Acetoacetylated Coating Resins, Witzeman, J. S.; Dell Nottingham, W.; Del Rector, F. J. Coatings Technology; Vol. 62, 1990, 10 1. (and references contained therein)).

The vinyl polymers of this invention are most often copolymers of the acetoacetate functional monomer and other monomers. Examples of useful comonomers are simple olefins such as ethylene, alkyl acrylates and methacrylates where the alkyl group has 1 to 20 carbon atoms (more preferably 1 to 8 carbon atoms), vinyl acetate, acrylic acid, methacrylic acid, acrylonitrile, styrene, isobornyl methacrylate, acrylamide, hydroxyethyl acrylate and methacrylate, hydroxypropyl methacrylate and acrylate, N-vinyl pyrolidinone, butadiene, isoprene, vinyl halides such as vinyl chloride and vinylidene chloride, alkyl maleates, alkyl fumarates, fumaric acid, maleic acid, itaconic acid, etc. It is also possible and sometimes desirable to include low levels of divinyl or polyvinyl monomers such as glycol polyacrylates, allyl methacrylate, divinyl benzene, etc. to introduce a controlled amount of gel in the latex particle. It is important, however, to be sure that when this is done, the quality of the film formation is not seriously impaired.

The acetoacetate functional polymer may contain from about 0.5% to 100% of the acetoacetate functional monomer by weight. In any application, the amount of acetoacetate functional monomer required will vary from case to case depending upon the desired degree of cure necessary in the particular end use application. Generally, however, the acetoacetate monomer concentration will be between 1 and 40%. Conventional coatings will usually contain from about 2.5 to 20% acetoacetate monomer by weight. Polymers having a molecular weight of from 1000 to over one million can be used. The lower molecular weight polymers should contain a sufficiently high level of acetoacetate to maximize cure. For example, a copolymer of AAEM having a molecular weight under 10,000 would typically contain 30% or more of AAEM.

Generally, the vinyl polymer is prepared as a dispersion or emulsion polymer in water by a suitable free radical initiated polymerization technique, using a free radical initiator and appropriate heating. Since a film forming polymer is required, useful emulsion polymers will generally have glass transition temperatures under 60° C. since these polymers with coalescent will form good quality films at ambient temperatures. If soluble polymers are used in the film formation process, polymers of higher glass transition temperature are readily used since they are film-forming.

In certain aspects of the invention, polymerization in an aqueous medium, and in particular, aqueous emulsion polymerization, is used to prepare the polymer. Conventional dispersants can be used (e.g., anionic and/or nonionic emulsifiers such as alkali or ammonium alkyl sulfates, alkyl sulfonic acids, and fatty acids, oxyethylated alkyl phenols, etc.) The amount of dispersant used is usually 0.1 to 6% by weight based on the weight of total monomer. Either thermal or redox initiation processes may be used. Conventional free radical initiators may be used (hydrogen peroxide, t-butyl hydroperoxide, ammonium and/or alkali persulfates, etc.); typically 0.05 to 3.0% by weight based on the weight of total monomer. Redox systems using the same initiators coupled with a suitable reductant (for example: isoascorbic acid, sodium bisulfite) can be used at similar levels. Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

The invention may also be practiced using a solvent soluble or water soluble polymer. When this is desired, the polymer may be prepared directly in water if the monomer mix is water soluble or, as is most often the case, the polymerization solvent is a water miscible solvent such as isopropanol, butyl cellosolve, propylene glycol, etc. In this case, water may be included in the polymerization mixture or post added after the polymerization is complete. In some cases, the polymer is prepared in a conventional organic solvent such as xylene or toluene. When organic solvent is employed with or without water, it is convenient to use a soluble organic free radical initiator such as azo-bis-isobutyronitrile, t-butyl-peroctoate, or benzoyl peroxide and whatever heat is convenient to assure smooth copolymerization. Another route to preparation of a water soluble polymer for this invention is to prepare a vinyl dispersion polymer having enough acrylic or methacrylic acid or other polymerizable acid monomer (usually greater than 10%) so that the emulsion polymer can be solubilized by addition of ammonia or other base. Water soluble polymers of this type are advantageously used as blends with conventional dispersion polymers, preferably those which also have pendant acetoacetate functionality. Systems of this type form a completely cured matrix when exposed to a free radical flux. The blend of alkali soluble resin and latex polymer has a particularly advantageous property combination of gloss and rheology and is useful in coatings and printing ink applications.

In another embodiment of this invention, an aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such dispersions are well known in the art. It is sometimes advantageous to introduce some crosslinking or gel structure by the sequential polymerization process in the core via low levels of a crosslinking monomer such as allyl methacrylate. The lightly crosslinked core does not adversely affect film formation and does in some cases result in better coatings, particularly when the pendant acetoacetate is concentrated in the shell.

As indicated above, the major use for this technology is for curing vinyl polymers dispersed or dissolved in aqueous solvents. Unfortunately, vinyl polymers containing pendant acetoacetate are prone to hydrolysis in water particularly on heat aging. The hydrolysis occurs at nearly any pH and yields acetoacetic acid,

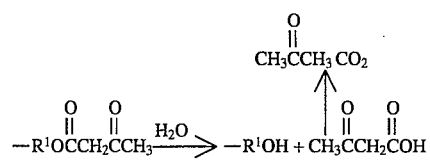

which in turn decomposes to acetone and carbon dioxide.

We have found, however, that this problem may be eliminated by treating the aqueous acetoacetate polymer, after preparation and neutralization, with one molar equivalent of ammonia or a primary amine such as ethanolamine, methyl amine, or isopropyl amine. Typically, the polymer is first neutralized to a basic pH, preferably a pH greater than 9, before adding the one molar equivalent for enamine formation. Under these conditions the enamine is formed. The reaction to form the enamine is generally rapid with the rate of formation increasing with temperature. In general, enamine formation is complete within 24 hours. An alternative approach is to raise the pH to about 9, allow the system to equilibrate, and readjust the pH to about 9 to replace the amine consumed by enamine formation. The enamine is stable to hydrolysis.

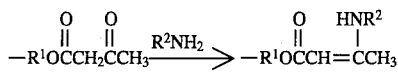

The amount of ammonia or amine used should tie at least equivalent to the amount of acetoacetate in the polymer. Sterically hindered primary amines such as t-butyl amine and aromatic amines such as aniline are not suitable because of incomplete enamine formation. The enamine formation is a reversible reaction, so that as the ammonia or amine evaporates after film formation and in exposure to the atmosphere, the pendant acetoacetate is regenerated in the film. The wet composition is quite storage stable, however, as long as it is stored under conditions (such as a closed container) where the amine/ammonia cannot evaporate. Cure of these films is not impeded by the presence of the ammonia or amine which normally evaporates.

Another approach to preparation of vinyl polymers containing equivalent pendant enamine functionally is to use preformed enamine monomers derived from the appropriate amine and the acetoacetate monomer. In this case, the pH must be kept on the alkaline side during polymerization to avoid hydrolysis of the enamine back to the acetoacetate.

A key element of the technology of this invention is an aerobic radical source. In most cases, the radical flux is generated by an autoxidizeable substance on exposure of the polymeric film to oxygen of the air. Autoxidizeable substances contain readily abstractable hydrogen atoms which allow it to undergo rapid free radical chain reactions with molecular oxygen. The autoxidizeable substance can be made a component of the composition in various ways. The autoxidizeable substance can be directly incorporated into the vinyl polymer by use of appropriate monomers or, more conveniently, an additive package which contains an autoxidizeable component can be added to the polymer after polymerization is complete. Monomers such as butadiene, isoprene, or dicyclopentenyl oxyethyl methacrylate (see U.S. 4,145,503) have residual unsaturation and allylic hydrogen atoms which are known to be subject to autoxidation. Methacrolein, with its pendant aidehyde groups, is another example of a monomer which introduces an autoxidizeable site into the polymer chain. Generally, the autoxidizeable monomer is incorporated into the polymeric binder at a level of 1 to 25 percent by weight. The autoxidizeable additive package, which is typically added to the dispersion after polymerization, consists of readily oxidizable substrates which are known to give peroxides or hydroperoxides on exposure to oxygen. Preferably, the autoxidizable component has oxidizibilities as defined by W. C. Lloyd ("Autoxidations" in Methods in Free-Radical Chemistry, E. S. Huyser (Editor), Vol. 4, Marcel Dekkor, New York, 1973) of greater than $1 \times 10^{-3}$ (liter/mole-sec)$^{0.5}$. These include drying oils such as linseed off, tung oil, dehydrated castor oil; drying oil fatty acids such as linseed oil fatty acid: alkyds containing drying oils; simple esters of drying oil fatty acids such as the ethyl ester of linseed oil fatty acid: sorbic acid and sorbic esters; allyl ethers and polyallyl ethers such as trimethylolpropane triallyl ether, polyallylglycidylether (Santolink XI-100, Monsanto Chemical Co.): and sterically hindered aldehydes or polyaldehydes which autoxidize but do not react with pendant acetoacetate groups present in the polymer. The aldehyde oxygen scavengers described in Novak et al, U.S. 4,886,618 are particularly useful in this regard. In general, any polyunsaturated material which undergoes autoxidation at ambient temperature can be used as a radical flux for this invention. The amount of autoxidizable material formulated with the polymer is typically in the range of from about 0.5 to 15% by weight with higher levels generally resulting in faster cure. For some end uses, the amount of autoxidizable material is limited by compatibility with the polymer since the quality of the film may be adversely affected although cure is still generally observed in these cases.

In order to facilitate the autoxidation process a drier or mixture thereof is typically included in the film-forming composition. This component may be any polyvalent metal containing complex or salt that catalyzes the oxidative curing of drying oils or drying oil modified alkyd resins. Examples are polyvalent metal salts containing cobalt, calcium, manganese, copper, zinc, iron, and zirconium as the cation. Simple salts such as the halides, nitrates, and sulfates may be used but in many cases an organic anion such as the acetate, napthenate, or the acetoacetonate is used for solubility or compatibility reasons.

The amount of drier required is low and is generally in the range of 0.01 to 1% metal content by weight of the film forming composition. The autoxidation process will take place without drier but it is impractically slow particularly at room temperature. Finally, if a cobalt drier is used and true one pack stability is desired, it may be useful to include a volatile stabilizer such as a ketone oxime or hindered aidehyde oxime. Specific examples are methyl ethyl ketone oxime, methyl butyl ketone oxime, 5-methyl-3-heptanone oxime and cyclohexanone oxime. Methyl ethyl ketone oxime is particularly useful. The exact function of the oxime in this system is unclear but it is believed to stabilize the cobalt by complex formation. After evaporation of the water or solvent, the volatile oxime is driven off and the drier activity of the cobalt is restored. The oxime stabilizer is typically used at 0.05 to 1% by weight of the film-forming composition.

As mentioned previously, it is possible to generate the radical flux via the metal catalyzed decomposition of peroxides or hydroperoxides at ambient temperature. Thus, a cobalt napthenate catalyzed decomposition of cumene hydroperoxide provides effective cure of an acetoacetate polymer after film formation. Such systems may be useful but they are normally two pack systems with limited pot life. They also function more effectively if both the peroxide or hydroperoxide are oil soluble. Typical mounts of the peroxide or hydroxide are from about 0.5 to about 10 percent by weight of the composition.

The polymers and additives of this invention may be formulated for the chosen end use. Additives such as thickeners, dispersants, pigment, extenders, fillers, anti-freeze agents, plasticizers, adhesion promoters, coalescents, wetting agents, defoamers, colorants, non-aldehyde based biocides, soaps, and slip agents may be incorporated to achieve suitable application techniques well known in the art.

The following examples are provided to illustrate aspects of the invention and should not be read as limiting the scope of the patent.

GLOSSARY

The following abbreviations are used in these Examples and are to be understood as having the meaning set forth in this glossary. All percentages in these examples are percent by weight unless otherwise specified. Unless otherwise indicated all polymers were prepared under nitrogen at atmospheric pressure.

AAEM - acetoacetoxyethyl methacrylate

BA- Butyl acrylate

Co - cobalt

Comp. - Comparative

MAA- Methacrylic acid

MEK- methyl ethyl ketone

MMA- methyl methacrylate nDDM- n-dodecyl mercaptan

PAGE- polyallylglycidylether (Santolink XI-100, Monsanto)

SF- soluble fraction

SR- swell ratio

THF- tetrahydrofuran ml- milliliters g- gram nms- nanometers

UV- ultraviolet eq. - equivalent

EXAMPLES

Test Procedures

The following test procedures were used to generate the data reported in the Examples below:

MEK Rub Resistance

Films were constantly soaked with methyl ethyl ketone. Data was obtained using a crockmeter with a 2 kg weight placed on the arm for a total weight of approximately 3000 g. The test ends when the breakthrough to the panel is first observed. Data are reported as double rubs (one set of back and forth).

Film Soluble Fraction and Swell Ratio (by weight)

Thin films were cast down on glass slides, a portion of the film was cut and removed from the glass slide. The samples were weighed and then soaked overnight in a container of methyl ethyl ketone. The methyl ethyl ketone mixture was filtered to drain unabsorbed MEK solution. The solvent mixture was evaporated in the oven at 150° C. for 30 minutes and the residue weighed. The soluble fraction was determined by division.

Film Swell Ratio by Volume

Thin films were cast down on glass slides and a portion of the film was cut and removed from the glass slide (soaking the glass slide in warm water for a few minutes aids film removal). The film samples were measured in two directions (length and width). The samples were then soaked for 15 minutes in methyl ethyl ketone and remeasured. The increase in each dimension was averaged to yield an average numeric value for linear swell, and the result was then cubed to yield a volumetric swell ratio.

Print

Thin films were cast down on black vinyl sheet and cured at ambient temperatures. A layer of cheesecloth was then placed over the film and covered by a rubber stopper that had a surface area of approximately one square inch. A one kilogram weight was placed on top of the stopper. The resulting test sample was then placed in an oven for the reported time at the reported temperature (typically for two hours at 60° C.) and then cooled. The print was then rated on a scale of 1 to 10 (best) according to observed ease of removal of the cheesecloth and the depth of the imprint of the film.

Block

Thin films were cast down on black vinyl sheet and cured at ambient temperatures. Two films were placed face-to-face and a one kilogram weight was placed on top. The resulting test sample was then placed in an oven typically for two hours at 60° C. and then cooled. The block was then rated on a scale of 1 to 10 (best) according to observed ease of separation of the films and film damage upon separation.

Latex Soluble Fraction and Swell Ratio for Heat Age Testing

The formulated emulsions were subjected to accelerated heat aging by placing them in a sealed container in a 60° C. oven for 10 days. Then a sample of the latex was removed and a 1 wt. % solution of the latex in tetrahydrofuran was equilibrated for 24 hours. The latex was then ultracentrifuged at 50,000 rpm for 160 minutes. The soluble fraction was obtained by determining the weight of polymer in the solvent phase divided by the total weight of polymer. The swell ratio was obtained by determining the weight of the undissolved gel after the solvent phase was removed and dividing the result by the weight of the polymer contained in that gel.

EXAMPLE 1

A polymer (Polymer 1) was prepared from a monomer mixture that contained 501.7 grams of water, 18.13 grams of Alipal CO-436 (an ammonium salt of sulfated nonylphenoxypoly (ethyleneoxy) ethanol; GAF Corp.), 672.3 grams of butyl acrylate, 652.9 grams of methyl methacrylate, 19.4 grams of methacrylic acid, 149.4 grams of acetoacetoxyethyl methacrylate and 3.0 grams of n-dodecyl mercaptan. From this monomer emulsion mixture, 47.2 grams was removed and added to a kettle containing a mixture of 1317.9 grams of water and 8.74 grams of Alipal CO-436 heated to 85° C. An initiator charge of 2.26 grams of sodium persulfate dissolved in 50.0 grams of water was added. Starting ten minutes later, the remaining monomer emulsion was gradually added over a two and one-half hour period along with 1.13 grams of sodium persulfate dissolved in 50 grams of water in a separate feed. After the two hour period, the emulsion was cooled to 60° C. and chased by adding 0.75 gram of t-butyl hydroperoxide dissolved in 12.5 grams of water followed by 0.45 grams of isoascorbic acid dissolved in 12.5 grams of water. The chase procedure was repeated 25 minutes later. The latex was then cooled to ambient temperature.

The latex was first neutralized with ammonia to pH=9.5. Then an additional one equivalent of ammonia (1.18 grams of a 28% solution of ammonium hydroxide) was added to 100 grams of the latex to convert all the acetoacetoxyethyl methacrylate to the corresponding enamine. To this latex was added 0.45 grams of Triton X-405 (a 70% aqueous solution of polyethoxylated nonylphenol, Union Carbide Corp.), and 0.2 grams of Foamaster VL (defoamer; Diamond Shamrock Chemical Co). The latex mixture was equilibrated overnight. An additives package consisting of 4.5 grams of propylene glycol, 4.5 grams of diisopropyladipate, 0.48 grams of Triton X-405, 5.62 grams of a 2% aqueous solution of Natrosol 250 MHR (hydroxyethylcellulose; Hercules Inc.), 0.75 grams of cobalt as noted (Intercar, a 6% water dispersible solution; Akzo), 0.21 grams of methyl ethyl ketone oxime and 1.25 grams (unless otherwise noted) of the autoxidizable component listed in the table below was mixed and the latex mixture was added to it. This formulated mixture was equilibrated for three days prior to film application.

Thin films were drawn down on B-1000 steel panels and glass slides and black vinyl sheet using a 15 mil gate to give dried films in the thickness range of 2-3 mils. Films were cured under ambient conditions on the laboratory benchtop for the duration of the tests. To test long term stability, a portion of the latex formulation was heated at 60° C. for 10 days before films were applied and then tested after 28 days at ambient conditions.

Film Swell Ratios

| Film | | 7 days | 28 days | 28 days (Heat Aged Latex) |
|---|---|---|---|---|
| | | | Ambient Cure Time: | |
| Comp. A | No cobalt[1] | dissolves | dissolves | 16.9 |
| Comp. B | cobalt[2] | 18.4 | 12.8 | 10.7 |
| | Autoxidizable Additive | | | |
| C | Oleic Acid | 13.8 | 5.7 | 4.2 |
| D | Linoleic Acid | 4.4 | 3.0 | 3.5 |
| E | Linolenic Acid | 3.7 | 2.2 | 3.0 |
| F | Linoleic Acid (Tech) | 3.4 | 2.7 | 2.9 |
| G | Linseed Oil Fatty Acid | 4.6 | 4.4 | 3.0 |
| H | Ethyl linoleate | 5.6 | 3.2 | 2.9 |
| I | Sorbic Acid | — | 7.4 | 5.8 |
| J | PAGE | 6.9 | 3.9 | 3.7 |
| K | PAGE (15 wt. %)[3] | 4.0 | 1.9 | 2.1 |

The samples according to the invention (C through K) showed improved degree of cure as indicated by Film Swell Ratio data over Comparative A, the latex alone, and Comparative B, the latex with cobalt.

Film Properties after 28 day cure under ambient conditions

| Film | MEK Rubs | | Print Rating[4] (best = 10) | Block Rating[5] (best = 10) |
|---|---|---|---|---|
| | Fresh latex | Heat-aged latex | | |
| Comp. A | 10 | 13 | 1 | 2 |
| Comp. B | 28 | 45 | 3 | 5 |
| C | 87 | 69 | 5 | 3 |
| D | 178 | 81 | 7 | 7 |
| E | 148 | 125 | 7 | 7 |
| F | 145 | 65 | 8 | 7 |
| G | 170 | 106 | 7 | 7 |
| H | 197 | 113 | 7 | 7 |
| I | 100 | 100 | 6 | 5 |
| J | 243 | 266 | 5 | 2 |
| K | 500 | 350 | 6 | 8 |

The Comparative Examples (A and B) show little cure in 7 days (as measured by swell ratio, solvent resistance and print and block). In contrast, when a low level of an autoxidizable additive such as linoleic acid (Film F) is incorporated, the 7 day cure is much better and the associated properties are in a practical range.

EXAMPLE 2

The Polymer 1 latex was formulated in the same fashion as in Example 1 except that the autoxidizable component was linoleic acid and was added at different levels according to the table below. Films were applied and cured as stated in Example 1.

Film Swell Ratios

| Film | Linoleic Acid Level | 7 days | 28 days | 28 days (Heat Aged Latex) |
|---|---|---|---|---|
| | | | Ambient Cure Time: | |
| L | 0.42 g | 9.1 | 5.1 | 4.8 |
| M | 0.84 g | 4.0 | 3.2 | 4.1 |
| N | 1.25 g | 3.8 | 3.1 | 3.1 |
| O | 1.67 g | 4.0 | 2.7 | 3.2 |
| P | 2.09 g | 5.2 | 1.9 | 2.5 |
| Q | 2.50 g | 3.5 | 1.6 | 2.5 |

Film Properties after 28 day cure under ambient conditions

| Film | MEK Rubs | | Print Rating (best = 10) | Block Rating (best = 10) |
|---|---|---|---|---|
| | Fresh latex | Heat-aged latex | | |
| L | 187 | 157 | 6 | 7 |
| M | 187 | 182 | 7 | 7 |
| N | 160 | 147 | 8 | 7 |
| O | 120 | 79 | 8 | 7 |
| P | 130 | 45 | 8 | 7 |
| Q | 88 | 53 | 9 | 7 |

The data indicates that higher mounts of linoleic acid improve the print rating but reduce solvent resistance as shown by MEK rubs.

EXAMPLE 3

Five polymers labeled 2, 3, 4, 5 and 6, containing varying amounts of AAEM monomer were prepared (0%, 1%, 5%, 10%, 20%). The preparation of Polymer 5 is set forth completely.

A polymer (5) was prepared from a monomer mixture that contained 525 grams of water, 7.28 grams of a 23% solution of sodium dodecyl benzene sulfonate, 642.6 grams of butyl acrylate, 747.6 grams of methyl methacrylate, 20.4 grams of methacrylic acid, 156.7 grams of acetoacetoxyethyl methacrylate, 3.13 grams of n-dodecyl mercaptan. From this monomer emulsion mixture, 49.1 grams was removed and added to a kettle containing a mixture of 1268.8 grams of water and 9.84 grams of a 23% solution of sodium dodecyl benzene sulfonate heated to 85° C. An initiator charge of 2.36 grams of sodium persulfate dissolved in 78.8 grams of water was added. Starting ten minutes later, the remaining monomer emulsion was gradually added over a two hour period along with 1.4 grams of sodium persulfate dissolved in 50 grams of water in a separate feed. After the two hour period, the emulsion was cooled to 60° C. at which point 1 gram of t-butyl hydroperoxide dissolved in 13.2 grams of water was added followed by 0.5 grams of isoascorbic acid dissolved in 13.1 grams of water. The latex was then cooled to ambient temperature.

The other four polymers of varying AAEM levels were made by the same procedure using the following monomer compositions: (Polymer 2) 721.0 grams of butyl acrylate, 826.0 grams of methyl methacrylate, 20.4 grams of methacrylic acid, 0 grams of acetoacetoxyethyl methacrylate, 3.13 grams of n-dodecyl mercaptan; (Polymer 3) 713.2 grams of butyl acrylate, 818.2 grams of methyl methacrylate, 20.4 grams of methacrylic acid, 15.9 grams of acetoacetoxyethyl methacrylate, 3.13 grams of n-dodecyl mercaptan; (Polymer 4) 681.8 grams of butyl acrylate, 786.8 grams of methyl methacrylate, 20.4 grams of methacrylic acid, 78.4 grams of acetoacetoxyethyl methacrylate, 3.13 grams of n-dodecyl mercaptan; (Polymer 6) 564.3 grams of butyl acrylate, 669.3 grams of methyl methacrylate, 20.4 grams of methacrylic acid, 313.5 grams of acetoacetoxyethyl methacrylate, 3.13 grams of n-dodecyl mercaptan.

Polymers 2, 3, 4, 5 and 6 were formulated and films (Comparative R and examples of the invention S, T, U and V) made in the manner as explained in Example 1 with the autoxidizable component consisting of 1.25 grams of linoleic acid.

| Film | Additional Additives | Film Soluble Fractions in THF | | |
|---|---|---|---|---|
| | | 1 day | 7 day | 14 day |
| Comp. W | None | 0.89 | 0.81 | 0.58 |
| Comp. X | cobalt,[7] 0.09 g | 0.83 | 0.54 | 0.34 |
| Y | Co + 0.14 g. tung oil | 0.57 | 0.14 | 0.13 |
| Z | Co + 0.14 g. oticia oil | 0.59 | 0.14 | 0.13 |

[7]Hydrocure II, a 5% water dispersible formulation; Mooney Chemicals, Inc.

The data for films Y and Z show that drying oils can be used as the autoxidizeable component of the invention.

| | Film Swell Ratios | | MEK Rubs | | Print[6] | Block |
|---|---|---|---|---|---|---|
| | | | Cure Time | | | |
| Film | 7 days | 28 days | 7 days | 28 days | 28 days | 28 days |
| Comp. R (0% AAEM) | dissolves | dissolves | 12 | 10 | 1 | 1 |
| S (1% AAEM) | 13.8 | 11.6 | 58 | 75 | 2 | 1 |
| T (5% AAEM) | 6.9 | 4.6 | 130 | 240 | 7 | 3 |
| U (10% AAEM) | 5.0 | 3.3 | 194 | >300 | 8 | 9 |
| V (20% AAEM) | 2.8 | 2.6 | 214 | >300 | 9 | 9 |

[6]test conditions for print and block: 2 hours at 60° C., rating: 10 = best?

The addition of AAEM to a polymer that is mixed with linoleic acid additive produces improved performance over the comparative Example which has no AAEM in the polymer mixed with linoleic acid. Higher AAEM levels give better performance.

EXAMPLE 4

A polymer (Polymer 7) was prepared from a monomer mixture that contained 505.6 grams of water, 18.1 grams of a 23% solution of sodium dodecyl benzene sulfonate, 1062.9 grams of butyl acrylate, 540.0 grams of methyl methacrylate, 25.7 grams of methacrylic acid, 85.71 grams of acetoacetoxyethyl methacrylate, 3.42 grams of n-dodecyl mercaptan. Then 40.0 grams of this monomer emulsion mixture was removed and added to a kettle containing a mixture of 1432.7 grams of water and 11.0 grams of a 2.3% solution of sodium dodecyl benzene sulfonate heated to 85° C. An initiator charge of 2.52 grams of sodium persulfate dissolved in 84.0 grams of water was added. Ten minutes later, the addition of remaining monomer emulsion was begun and continued gradually over a two hour period. After the two hour period, the emulsion was cooled to 60° C. and chased by adding 0.8 gram of t-butyl hydroperoxide dissolved in 16 grams of water followed by 0.5 grams of sodium formaldehyde bisulfite dissolved in 16 grams of water. The latex was then cooled to ambient temperature.

A 100 gram sample of the latex was removed and to this was added 2.0 grams of ammonium hydroxide (28% solution), 1.0 gram of Triton X-405 (a 70% aqueous solution, Union Carbide Corp.), 4.5 grams of diisopropyladipate and 4.5 grams of propylene glycol. 10 gram samples of this latex were removed and the materials listed in the Table below were added to each. The latex was equilibrated overnight before films were applied to glass slides using a 8 mil gate. Soluble fractions were determined from the thin films.

EXAMPLE 5

A polymer (Polymer 8) was prepared from a monomer mixture that contained 1479.6 grams of water, 5.1 grams of a 23% solution of sodium dodecyl benzene sulfonate, 1089.4 grams of ethyl acrylate, 667.5 grams of methyl methacrylate, 25.8 grams of methacrylic acid and 198.1 grams of acetoacetoxyethyl methacrylate. In a kettle containing a mixture of 741 grams of water heated to 85° C. was added 21.5 grams of a 45% solids solution containing 100 nm particles of BA/MMA/MAA latex polymer preform. An initiator charge of 7.6 grams of sodium persulfate dissolved in 25 grams of water was added. The remaining monomer emulsion was gradually added over a three and one-half hour period along with 2.0 grams of sodium persulfate dissolved in 100 grams of water in a separate feed. After one hour of the feeds, an additional soap mixture was added consisting of 5.1 grams of a 23% solution of sodium dodecyl benzene sulfonate dissolved in 9 grams of water. After the feeds were complete, the temperature was held at 85° C. for 15 minutes. The latex was then cooled to ambient temperature.

A 100 gram sample of latex was neutralized to pH=9.5 with ammonium hydroxide, allowed to react to form enamine, and then readjusted to pH 9.5 with ammonium hydroxide. To this was added 0.3 grams of Foamaster VL (defoamer; Diamond Shamrock Chemical Company), 10.8 grams of propylene glycol, 4.5 grams of Texanol (a coalescent; Texaco), 0.22 grams of methyl ethyl ketone oxime (Exkin #2; Nuodex Inc.), 1.4 grams of the autoxidative material listed in the Table, and 0.75 grams of cobalt (Intercar, a 6% water dispersible formulation; Akzo). Thin films were drawn down on glass slides using an 8 mil gate to give dried films in the thickness range of 1-1.5 mils. Films were cured under ambient conditions at 70° C. and 50% relative humidity for the duration of the tests.

| Film | Additive | Thin Film Swell Ratios Cure time: | | | |
|------|----------|-------|-------|--------|--------|
|      |          | 1 day | 7 day | 14 day | 28 day |
| AA   | None         | 16 | 16   | 16  | 16  |
| AB   | Linseed Oil  | 19 | 14   | 12  | 8.2 |
| AC   | Aroplaz 1271[8] | 14 | 11 | 8.2 | 7.9 |
| AD   | Aroplaz 1272[9] | 19 | 9.4 | 9.2 | 7.0 |

The data for Examples AB, AC and AD demonstrate that linseed oil and alkyds can be used as the autoxidizeable component in the invention and cure better than Comparative AA over time.

EXAMPLE 6

A polymer (Polymer 9) was prepared from a monomer mixture that contained 524.9 grams of water, 18.98 grams of sodium lauryl sulfate (28% aqueous solution in water), 658.32 grams of butyl acrylate, 728.86 grams of methyl methacrylate, 23.51 grams of methacrylic acid, 156.74 grams of acetoacetoxyethyl methacrylate, 3.13 grams of butyl mercaptopropenate. A 49.4 gram sample was removed from this monomer emulsion mixture and added to a kettle which contained a mixture of 1268.8 grams of water and 9.15 of sodium lauryl sulfate (28% aqueous solution) heated to 85° C. An initiator charge of 2.36 grams of sodium persulfate dissolved in 78.75 grams of water was added. Starting ten minutes later, the remaining monomer emulsion was gradually added over a two hour period. After the two hour period, the emulsion was cooled to 60° C. and chased by adding 0.79 gram of t-butyl hydroperoxide dissolved in 13.13 grams of water followed by 0.47 grams of isoascorbic acid dissolved in 13.13 grams of water. The chase procedure was repeated 20 minutes later. The latex was then cooled to ambient temperature.

The latex was then neutralized with ammonia to pH=9.5. 20 gram samples of the latex were removed and an additional one equivalent of ammonia (0.24 grams of a 28% solution of ammonium hydroxide) was added to convert all the acetoacetoxyethyl methacrylate to the corresponding enamine. To this latex was added 0.27 grams of autoxidizable material. An additives package consisting of 0.9 grams of propylene glycol, 0.9 grams of diisopropyladipate, 1.13 grams of a 2% aqueous solution of Natrosol 250 MHR (hydroxyethylcellulose thickener; Hercules, Inc.) and 0.15 grams of cobalt (Intercar, a 6% water dispersible formulation; Akzo) was mixed and the latex mixture was added to it. This formulated mixture was equilibrated overnight prior to film application as explained in Example 1.

| Film | Autoxidizable Material | MEK Rubs 1 day/ 28 day | Thin Film Swell Ratio 28 day |
|------|------------------------|------------------------|------------------------------|
| AE   | Hypermer A-109[10]     | 30/62   | 8   |
| AF   | Hypermer A-394         | 22/119  | 5.8 |
| AG   | Hypermer A-409         | 23/110  | 8   |
| Comp. AH | Triton X-405[11]-Control | 21/54 | highly swollen gel |

The data shows that unsaturated nonionic soaps can be used as the autoxidizeable component in the invention.

EXAMPLE 7

A polymer (Polymer 10) was prepared from a monomer mixture that contained 507.6 grams of water, 19.0 grams of a 23% solution of sodium dodecyl benzene sulfonate, 771.4 grams of butyl acrylate, 831.4 grams of methyl methacrylate, 25.71 grams of methacrylic acid, 85.71 grams of acetoacetoxyethyl methacrylate, 3.42 grams of n-dodecyl mercaptan. 40 grams of this monomer emulsion mixture was removed and added to a kettle containing a mixture of 1406.7 grams of water and 9.0 grams of a 23% solution of sodium dodecyl benzene sulfonate heated to 85° C. An initiator charge of 2.52 grams of sodium persulfate dissolved in 84 grams of water was added. Starting ten minutes later, the remaining monomer emulsion was gradually added over a two hour period. After the two hour period, the emulsion was cooled to 60° C. and chased by first adding 10.0 grams of a 0.15% solution of iron (II) sulfate in water followed by 0.8 grams of t-butyl hydroperoxide dissolved in 16 grams of water, followed by 0.4 grams of isoascorbic acid dissolved in 16 grams of water. The chase procedure was repeated 20 minutes later. The latex was then cooled to ambient temperature.

A polymer without AAEM, Comparative Polymer 11, was prepared from a monomer mixture that contained 525 grams of water, 17.1 grams of a 23% solution of sodium dodecyl benzene sulfonate, 705.3 grams of butyl acrylate, 838.5 grams of methyl methacrylate, 23.5 grams of methacrylic acid, 3.13 grams of n-dodecyl mercaptan. From this monomer emulsion mixture, 49.3 grams was removed and added to a kettle containing a mixture of 1268.8 grams of water and 9.0 of a 2.3% solution of sodium dodecyl benzene sulfonate heated to 85° C. An initiator charge of 2.36 grams of sodium persulfate dissolved in 78.8 grams of water was added. Starting ten minutes later, the remaining monomer emulsion was gradually added over a two hour period. After the two hour period, the emulsion was cooled to 60° C. and chased by first adding 0.79 grams of t-butyl hydroperoxide dissolved in 13.13 grams of water followed by 0.47 grams of isoascorbic acid dissolved in 13.13 grams of water. The chase procedure was repeated 20 minutes later. The latex was then cooled to ambient temperature.

To 100 grams of each latex was added 0.7 grams of Emulphor EL-620 (polyethoxylated castor oil; GAF Corp.), 0.02 grams of t-butyl hydroperoxide, and the pH of the latex was raised to 9.5 with 5 wt. % aqueous solution of potassium hydroxide, then 0.7 grams of a 28% aqueous solution of ammonium hydroxide was added to form enamine. An additives package consisting of 2.1 grams of propylene glycol, 2.1 grams of diisopropyladipate, 0.2 grams of Emulphor EL-620, 2.1 grams of a 2% aqueous solution of Natrosol 250 MHR (hydroxyethylcellulose thickener; Hercules, Inc.), 0.21 grams of cobalt (Intercar, a 6% water dispersible formulation; Akzo) and if noted below 0.8 grams of Kelsol 3905 (a water dispersible alkyd; NL Chemicals) as the autoxidizable component. The latex mixture was added to the additives package and the resulting formulated mixture was equilibrated overnight prior to film application which was carried out as in Example 1.

| Film | Polymer | Autoxidizable Material | MEK Rubs 1 day/28 day |
|------|---------|------------------------|------------------------|
| Comp. AI | Polymer 10 | None       | 20/28    |
| AJ       | Polymer 10 | Kelsol 3905 | 26/>300 |
| Comp. AK | Comp. 11   | None       | 22/19    |
| Comp. AL | Comp. 11   | Kelsol 3905 | 19/16   |

Film AJ shows good cure from the addition of the water dispersible alkyd in contact with AAEM polymer. Comparative AI shows the AAEM polymer alone. Comparative AK and AL shows that the water-dispersible alkyd does not improve the cure of a polymer without acetoacetate functionality.

EXAMPLE 8

Comparative Polymer 12 was prepared from a monomer mixture which contained 501.7 grams of water, 18.13 grams of Alipal CO-436 (an ammonium salt of sulfated nonylphenoxypoly (ethyleneoxy) ethanol; GAF Corp.), 149.4 grams of acetoacetoxyethyl methacrylate, 672.3 grams of butyl acrylate, 652.9 grams of methyl methacrylate, 19.42 grams of methacrylic acid and 2.99 grams of n-dodecylmercaptan. From this monomer emulsion mixture, 47.2 grams was removed and added to a kettle containing a mixture of 13 17.9 grams of water and 8.74 grams of Alipal C0-436 and heated to 85° C. An initiator charge of 2.26 grams of sodium persulfate dissolved in 50 grams of water was added. Starting ten minutes later, the remaining monomer emulsion was gradually added over three hours along with 1.13 grams of sodium persulfate dissolved in 50 grams of water in a separate feed for three hours. After the feeds were completed, the reaction was held at 85° C. for 20 minutes, then the emulsion was cooled to 60° C. and chased by adding 0.75 gram of t-butyl hydroperoxide dissolved in 12.5 grams of water followed by 0.45 grams of isoascorbic acid dissolved in 12.54 grams of water. The latex was then cooled to ambient temperature.

Following the same procedure, Polymer 13 was made using a monomer emulsion consisting of 501.7 grams of water, 18.13 grams of Alipal CO-436, 149.4 grams of acetoacetoxyethyl methacrylate, 672.3 grams of butyl acrylate, 623.0 grams of methyl methacrylate, 29.9 grams of methacrolein, 19.42 grams of methacrylic acid and 2.99 grams of n-dodecylmercaptan.

The latex was neutralized to pH=9.5 with ammonium hydroxide and a 100 gram sample was removed and 0.45 grams of Triton X-405 (a 70% aqueous solution, Union Carbide Corp.) was added. An additives mixture consisting of 4.3 grams of propylene glycol, 4.3 grams of diisopropyladipate, 5.3 grams of a 2% solution of hydroxyethylcellulose, 0.7 grams of a 6% solution of cobalt (Intercar), 0.13 grams of methyl ethyl ketone oxime and 0.2 grams of Foamaster AP (a defoamer; Diamond Shamrock) was prepared. The pH of the emulsion was readjusted to 9.5 with ammonium hydroxide and the emulsion was added to the additives package with stirring and equilibrated overnight. Films were applied following the procedure in Example 1.

| Film | | 1 day | Film Swell Ratio 28 day |
|---|---|---|---|
| Comp. AM | Comparative 12 - no methacrolein | 18 | 11 |
| Comp. AN | Polymer 13 - with methacrolein | 16 | 3.8 |

Polymer 13 contained the autoxidizeable components (methacrolein) copolymerized into the polymer. Comparative Polymer 12 had no autoxidizeable component on the polymer or in the formulation. The data shows that the acetoacetate and autoxidizeable component can be present on the same polymer.

EXAMPLE 9

A polymer (Polymer 14) was prepared from a monomer mixture contained 501.7 grams of water, 18.13 grams of Alipal CO-436 (an ammonium salt of sulfated nonylphenoxypoly (ethyleneoxy) ethanol; GAF Corp.), 149.4 grams of acetoacetoxyethyl methacrylate, 672.3 grams of butyl acrylate, 652.9 grams of methyl methacrylate, 19.42 grams of methacrylic acid and 2.99 grams of n-dodecylmercaptan. 47.2 grams was removed from this emulsion mixture and added to a kettle containing a mixture of 1317.9 grams of water and 8.74 grams of Alipal CO-436 heated to 85° C. An initiator charge of 2.26 grams of sodium persulfate dissolved in 50 grams of water was added. Starting ten minutes later, the remaining monomer emulsion was gradually added over three hours along with 1.13 grams of sodium persulfate dissolved in 50 grams of water in a separate feed for three hours. After the feeds were completed, the reaction was held at 85° C. for 20 minutes, then the emulsion was cooled to 60° C. and chased by adding 0.75 gram of t-butyl hydroperoxide dissolved in 12.5 grams of water followed by 0.45 grams of isoascorbic acid dissolved in 12.54 grams of water. The latex was then cooled to ambient temperature.

The latex that was neutralized to pH=9.5 with ammonium hydroxide, a 100 gram samples was removed and 0.45 grams of Triton X-405 (a 70% aqueous solution, Union Carbide Corp.) was added to the sample. An additives mixture was prepared consisting of 4.3 grams of propylene glycol, 4.3 grams of diisopropyladipate, 5.3 grams of a 2% solution of Natrosol 250 MHR (hydroxyethylcellulose thickener; Hercules, Inc.), 0.7 grams of cobalt (Intercar, a 6% water dispersible cobalt formulation; Akzo), 0.13 grams of methyl ethyl ketone oxime and 0.2 grams of Foamaster AP (defoamer; Diamond Shamrock Chemical Company) along with the autoxidizable additives in the Table below. After 24 hours, the pH of the Polymer 13 emulsion was readjusted to 9.5. The emulsion was added to the additives package with stirring and equilibrated overnight. Films were applied following the procedure in Example 1.

| Film | | Film Swell Ratio | |
|---|---|---|---|
| | | 1 day | 28 day |
| Comp. AO | None-Control (contains cobalt) | 18 | 11 |
| AP | Dialdehyde[12] | 13 | 4.2 |
| AQ | Boiled Linseed Oil | 11 | 4.5 |
| AR | Tetraallylpentaerythritol | 11 | 4.0 |
| AS | Tetraallyloxyethane | 8.7 | 7.2 |
| AT | 2,4,6-triallyloxy-1,3,5-triazine | 14 | 9.4 |
| AU | Triallyl-1,3,5-triazine-2,4,6-trione | 16 | 5.1 |

The data for films AP through AU show that aldehydes and allyl functional materials can be used to provide free radicals for the acetoacetate cure, producing improved cure over the Comparative AO film.

EXAMPLE 10

The polymer emulsions listed in Example 3 (having 0, 1, 5, 10 and 20% AAEM) were formulated as described in Example except that the autoxidizable component was polyallylglycidylether (Santolink XI-100, Monsanto) in the amounts listed in the Table below.

| Polymer | PAGE (grams) | Film Swell Ratios | | MEK Rubs | | Print Rating | Block Rating |
|---|---|---|---|---|---|---|---|
| | | fresh | heat-aged | fresh | heat-aged | | |
| 2 | 0 | dissolve | dissolve | 12 | 6 | 1 | 1 |
| 3 | 0 | 13 | dissolve | 66* | 10 | 2 | 1 |
| 4 | 0 | 11 | 12 | 101* | 40* | 2 | 3 |
| 5 | 0 | 9.8 | 12 | 122* | 56* | 3 | 5 |
| 6 | 0 | 9.3 | 7.3 | 189* | 100* | 4 | 8 |
| 2 | 1.25 | 11 | 10 | 15 | 10 | 1 | 1 |
| 3 | 1.25 | 9.1 | 8.3 | >200 | 201 | 3 | 3 |
| 4 | 1.25 | 3.1 | 4.3 | 214 | 217 | 6 | 6 |
| 5 | 1.25 | 2.7 | 2.9 | 250 | 270 | 8 | 8 |
| 6 | 1.25 | 1.6 | 2.0 | >300 | >300 | 8 | 8 |
| 2 | 3.75 | 6.2 | 8.3 | 72 | 60 | 1 | 1 |
| 3 | 3.75 | 4.7 | 5.7 | 250 | 270 | 4 | 5 |
| 4 | 3.75 | 2.9 | 3.2 | >300 | >300 | 8 | 7 |
| 5 | 3.75 | 2.6 | 2.8 | >300 | >300 | 9 | 8 |
| 6 | 3.75 | 1.6 | 1.9 | >300 | >300 | 9 | 9 |
| 2 | 6.25 | 4.9 | 5.2 | 84 | 60 | 3 | 1 |
| 3 | 6.25 | 3.6 | 4.3 | >300 | 195 | 4 | 6 |
| 4 | 6.25 | 2.8 | 3.6 | >300 | >300 | 7 | 7 |
| 5 | 6.25 | 2.4 | 3.0 | >300 | >300 | 9 | 9 |
| 6 | 6.25 | 1.6 | 1.6 | >300 | >300 | 9 | 9 |

Notes: *bottom cure only, surface abrades within 10–20 rubs

The data show that the compositions according to the invention exhibit improved performance over the comparative examples which are missing an ingredient of the invention (those containing 0 grams PAGE and all those which use Polymer 2, containing 0% AAEM).

EXAMPLE 11

A polymer (Polymer 15) was prepared by adding 362 grams of water to a kettle and heating to 85° C. To the heated kettle 1.4 grams of sodium persulfate was added along with 43 grams of 45% solids, 100 nm BA/MMA/MAA latex polymer preform. The reaction was allowed to equilibrate to 85° C. A monomer emulsion was prepared containing 179 grams of water, 5 grams of a 23% solution of sodium dodecyl benzene sulfonate, 369 grams of butyl acrylate, 94 grams of acetoacetoxyethyl methacrylate, and 7.1 grams of methacrylic acid. This monomer emulsion was fed into the above kettle at 1.5 ml per minute for 15 minutes until the addition was completed. Over the same period of time a solution of 0.7 grams of sodium persulfate in 25 ml of water was added to the kettle at 7.4 ml per hour. When the feeds were completed, the reaction was held at 85° C. for 30 minutes then cooled to 65° C. and chased by adding 1 gram of a 0.48% iron sulfate solution followed by 0.15 grams of t-butyl hydroperoxide dissolved in 5 grams of water followed by 0.07 grams of sodium formaldehyde bisulfite dissolved in 5 grams of water. The latex was then cooled to room temperature.

Aliqouts of the latex were neutralized as shown in the table below (the equivalents were based on the total moles of acid plus moles of AAEM). The latex was heat aged for ten days at 60° C. Acetoacetate hydrolysis was determined by $^{13}C$ NMR of the latex.

| Base | pH Initial | pH Final | % Hydrolysis |
|---|---|---|---|
| None | 2.0 | 2.0 | 60 |
| $Na_2HPO_4$ | 6.6 | 6.6 | 67 |
| Sodium hydroxide | 9.7 | 7.4 | 75 |

-continued

| Base | pH Initial | pH Final | % Hydrolysis |
|---|---|---|---|
| ammonium hydroxide (no enamine) | 9.5 | 7.7 | 79 |
| ammonium hydroxide (1.5 eq.) | 9.5 | 9.5 | 0 |
| isopropylamine (1 eq) | 9.5 | — | 0 |
| benzylamine (1 eq) | 9.5 | — | 0 |

The data demonstrates that ammonium hydroxide and amine Stabilize the acetoacetate functionality against hydrolysis.

EXAMPLE 12

A polymer (Polymer 16) was prepared by adding 1592.9 grams of water and 8.22 grams of a 23% solution of sodium dodecyl benzene sulfonate to a kettle and heating to 85° C. To the heated kettle, 3.02 grams of sodium persulfate was added along with 58.7 grams of the monomer mixture. The reaction was allowed to equilibrate to 85° C. A monomer emulsion was prepared containing 630 grams of water, 9.87 grams of a 23% solution of sodium dodecyl benzene sulfonate, 940.5 grams of butyl acrylate, 818.2 grams of methyl methacrylate, 94 grams of acetoacetoxyethyl methacrylate, and 28.22 grams of methacrylic acid. This monomer emulsion was fed into the above kettle at 4.2 ml per minute for 15 minutes then at 14.9 ml per minute until the addition was completed. Over the same period of time a solution of 0.85 grams of sodium persulfate in 50 ml of water was added to the kettle at 0.28 ml per minute. When the feeds were completed, the reaction was held at 85° C. for 30 minutes then cooled to 65° C. and chased by adding 1 gram of a 0.48% aqueous iron sulfate solution followed by 0.54 grams of t-butyl hydroperoxide dissolved in 18.1 grams of water followed by 0.38 grams of isoascorbic acid dissolved in 19.0 grams of water. The latex was then cooled to room temperature.

The latex was neutralized with 1.2 equivalents of ammonium hydroxide based on polymeric acetoacetate. Very thin films (1.95 microns) were made by spin casting on quartz plates. Since enamine displays a UV absorption maximum at 360 nms, the film was monitored to determine the conversion of enamine functionality to acetoacetate functionality by loss of ammonia from the film which would reduce the signal at 360 nms. The observed decrease in signal after 8 hours at ambient temperatures corresponds to a 40% loss of the enamine.

EXAMPLE 13

A polymer (Polymer 17) was prepared from a monomer mixture that contained 158.12 grams of water, 5.82 grams of a 23% solution of sodium dodecyl benzene sulfonate, 240.3 grams of butyl acrylate, 258.9 grams of methyl methacrylate, 8.01 grams of methacrylic acid, 26.7 grams of acetoacetoxyethyl methacrylate, 1.06 grams of n-dodecyl mercaptan. From this monomer emulsion mixture, 40 grams was removed and added to a kettle containing a mixture of 428.2 grams of water and 3.42 grams of a 2.3% solution of sodium dodecyl benzene sulfonate heated to 85° C. An initiator charge of 0.78 grams of sodium persulfate dissolved in 26.2 grams of water was added. Ten minutes later, 0.25 grams of sodium carbonate dissolved in ten grams of water was added. Then, the remaining monomer emulsion was gradually added over a two hour period. After the two hour period, the emulsion was cooled to 60° C. and chased by adding 0.25 gram of t-butyl hydroperoxide dissolved in 5 grams of water followed by 0.16 grams of isoascorbic acid dissolved in 5 grams of water. The latex was then cooled to ambient temperature.

The latex was first neutralized with ammonia to pH=9.5. Then, to 100 grams of the latex was added an additional one equivalent of ammonia (0.59 grams of a 28% solution of ammonium hydroxide) was added to convert all the acetoacetoxyethyl methacrylate to the corresponding enamine. To this latex was added 0.45 grams of Triton X-405 (a 70% aqueous solution, Union Carbide Corp.). The latex mixture was equilibrated overnight. An additives package consisting of 4.5 grams of propylene glycol, 4.5 grams of diisopropyladipate, 0.48 grams of Triton X-405, and 5.62 grams of a 2% aqueous solution of Natrosol 250 MHR (hydroxyethylcellulose thickener; Hercules, Inc.) was mixed with the materials in the table below and the latex mixture was added to it. The formulated mixtures were then aged using accelerated heat-ageing conditions (ten days at 60° C.). The soluble fraction of the formulated latex was then determined.

| Film | Additional Additives | Soluble Fraction in THF |
| --- | --- | --- |
| Comp. AV | None | 0.96 |
| AW | Cobalt[13] (0.7 grams) | 0.30 |
| AX | Co with methyl ethyl ketone and oxime (0.21 grams) | 0.89 |
| AY | Co with linoleic acid (1.3 grams) | 0.27 |
| AZ | Co with sorbic acid (1.3 grams) | 0.35 |
| BA | Co with linoleic acid and oxime | 1.00 |
| BB | Co with sorbic acid and oxime | 0.94 |

[13]Intercar, a 6% water dispersible cobalt formulation; Akzo

This data demonstrates the one-pack stability of systems that include an oxime (AX, BA and BB). The lower soluble fraction in AW, AY and AZ shows that reaction occured in the liquid composition.

EXAMPLE 14

Polymer 18 was prepared from a monomer mixture that contained 507.6 grams of water, 19.0 grams of a 23% solution of sodium dodecyl benzene sulfonate, 771.4 grams of butyl acrylate, 831.4 grams of methyl methacrylate, 25.7 grams of methacrylic acid, 85.7 grams of acetoacetoxyethyl methacrylate, 3.42 grams of n-dodecyl mercaptan. From this monomer emulsion mixture, 40 grams was removed and added to a kettle containing a mixture of 1406.7 grams of water and 9.0 grams of a 2.3% solution of sodium dodecyl benzene sulfonate heated to 85° C. An initiator charge of 2.52 grams of sodium persulfate dissolved in 84 grams of water was added. Starting ten minutes later, the remaining monomer emulsion was gradually added over a two hour period. After the two hour period, the emulsion was cooled to 60° C. at which point 10 grams of a 0.15% aqueous solution of iron (II) sulfate, 0.8 gram of t-butyl hydroperoxide dissolved in 16 grams of water was added followed by 0.4 grams of isoascorbic acid dissolved in 16 grams of water. The latex was then cooled to ambient temperature.

A two-stage polymer (19) was prepared from two monomer mixtures: the first stage consisting of 70% of the total monomers contained 318 grams of water, 39.8 grams of Sipon L22 (surfactant, Alcolac Inc.), 509.6 grams of butyl acrylate, 318.4 grams of methyl methacrylate, 4.9 grams of methacrylic acid, 49.0 grams of acetoacetoxyethyl methacrylate and 98 grams of styrene; the second consisting of 30% of the total contained 254 grams of water, 9.8 grams of Sipon L22, 210 grams of butyl acrylate, 42 grams of methyl methacrylate, 84 grams of methacrylic acid, 84 grams of acetoacetoxyethyl methacrylate and 14.1 grams of methyl mercaptopropionic acid. A 35 gram sample of the first monomer emulsion mixture was removed and added to a kettle containing a mixture of 1158 grams of water, 6.7 grams of Sipon L22 and 2.1 grams of sodium acetate heated to 85° C. An initiator charge of 1.1 grams of sodium persulfate dissolved in 50 grams of water was added. Starting ten minutes later, a catalyst feed consisting of 3.2 grams of sodium persulfate dissolved in 100 grams of water was gradually added over a four hour feed time. The remaining first monomer emulsion was gradually added over a two hour period. The latex temperature was maintained for thirty minutes and then the second monomer emulsion was gradually added over one hour. After all the feeds were completed, the reaction was cooled to 60° C. at which point 0.8 grams of t-butyl hydroperoxide dissolved in 50 grams of water was added followed by 0.5 grams of isoascorbic acid dissolved in 50 grams of water. The latex was then cooled to ambient temperature.

To 100 grams of each latex was added 0.5 grams of Triton X-405 (a 70% aqueous solution, Union Carbide Corp.), 0.02 grams of t-butyl hydroperoxide and the latex was neutralized to pH=9.5 with ammonium hydroxide (28% aqueous solution). An additives mixture was prepared consisting of 1.5 grams of Triton X-405, 12 grams of diisopropyladipate, 30 grams of a 2% aqueous Natrosol 250 MHR solution (thickener; Hercules, Inc.). The materials listed in the Table below were added to 2.5 grams of the additives mix. The pH of a 15 gram sample of the latex solution was readjusted to 9.5 and then added to the additives. This formulated mixture was equilibrated overnight prior to film application.

Thin films were drawn down on B-1000 steel panels using a 15 mil gate to give dried films in the thickness range of 2-3 mils. Films were cured under ambient conditions on the laboratory benchtop for the duration of the tests.

| Film | Polymer | Additives | MEK Rubs 1 day | 28 days |
|---|---|---|---|---|
| BC | 18 | None | 8 | 7 |
| BD | 18 | Cobalt[14] | 20 | 48 |
| BE | 18 | Cobalt/Linoleic Acid | 28 | 67 |
| BF | 19 | None | 9 | 7 |
| BG | 19 | Cobalt | 15 | 9 |
| BH | 19 | Cobalt/Linoleic Acid | 16 | 270 |

[14]Intercar, a 6% water dispersible cobalt formulation; Akzo

The films according to the invention, BE and BH, exhibit improved MEK rubs versus the Comparatives (BC, BD, BF and BG).

EXAMPLE 15

A polymer (Polymer 20) was prepared from a monomer mixture that contained 1100 grams of water, 51.4 grams of sodium lauryl sulfate (28% aqueous solution), 810 grams of butyl acrylate, 360 grams of methacrylic acid, 630 grams of acetoacetoxyethyl methacrylate, 36 grams of butyl mercaptopropionate. From this monomer emulsion mixture, 100 grams was removed and added to a kettle containing a mixture of 780.6 grams of water, 9.0 grams of sodium acetate and 45 grams of sodium lauryl sulfate (28% aqueous solution) heated to 81 °C. An initiator charge of 3.60 grams of sodium persulfate dissolved in 50.0 grams of water was added. Starting ten minutes later, the remaining monomer emulsion was gradually added over a three hour period along with 2.70 grams of sodium persulfate dissolved in 50 grams of water in a separate feed. After the three hour period, the emulsion was cooled to 55° C. and chased by adding 5.0 grams of a 0.15% aqueous solution of iron (II) sulfate and 1.0 gram of t-butyl hydroperoxide dissolved in 10.0 grams of water followed by 0.5 grams of isoascorbic acid dissolved in 20 grams of water. After 20 minutes, 15.0 grams of 10% hydrogen peroxide in 10.0 grams of water was added. This was repeated 20 minutes later. The latex was then cooled to ambient temperature.

The dispersion was neutralized to pH=9.5 with ammonium hydroxide and diluted to approximately 30% solids. To 50 gram aliquots was added 0.15 grams of cobalt (Nuocure, 10% water dispersible formulation; Nuodex, Inc.) and 0.45 grams of the appropriate unsaturated fatty amine listed in the table below.

Thin films were drawn down on B-1000 steel panels using a 15 mil gate to give dried films in the thickness range of 2–3 mils. Films were cured under ambient conditions on the laboratory benchtop for the duration of the tests.

| Film | Autoxidizable Additive | Film Swell Ratio |
|---|---|---|
| BI | None | dissolve |
| BJ | Soya oil fatty amine[15] | 10 |
| BK | Tall oil fatty amine[16] | 6.6 |

This demonstrates the cure of a water soluble AAEM-containing polymer with unsaturated fatty amines, examples BJ and BK. The comparative example, film BI, dissolved.

EXAMPLE 16

A polymer (Polymer 21) was prepared from a monomer mixture that contained 525 grams of water, 7.28 grams of a 23% solution of sodium dodecyl benzene sulfonate, 642.6 grams of butyl acrylate, 747.6 grams of methyl methacrylate, 20.4 grams of methacrylic acid, 156.7 grams of acetoacetoxyethyl methacrylate, 3.1 grams of n-dodecyl mercaptan. From this monomer emulsion mixture, 49.1 grams was removed and added to a kettle containing a mixture of 1268.8 grams of water and 9.84 grams of a 23% solution of sodium dodecyl benzene sulfonate heated to 85° C. An initiator charge of 2.36 grams of sodium persulfate dissolved in 78.8 grams of water was added. Starting ten minutes later, the remaining monomer emulsion was gradually added over a two hour period along with 1.4 grams of sodium persulfate dissolved in 50 grams of water in a separate feed. After the two hour period, the emulsion was cooled to 60° C. and chased by adding 1.0 gram of t-butyl hydroperoxide dissolved in 13.1 grams of water followed by 0.5 grams of isoascorbic acid dissolved in 13.1 grams of water. The latex was then cooled to ambient temperature.

The latex (41.7% solids) was first neutralized with ammonia to pH=9.5. Then, to 100 grams of the latex was added an additional one equivalent of ammonia (1.18 grams of a 28% solution of ammonium hydroxide) to convert all the acetoacetoxyethyl methacrylate to the corresponding enamine. To this latex was added 0.45 grams of Triton X-405 (70% aqueous solution; Union Carbide Corp.), and the latex mixture was equilibrated overnight. An additives package was prepared consisting of 4.5 grams of propylene glycol, 4.5 grams of diisopropyladipate, 0.48 grams of Triton X-405, 5.62 grams of a 2% aqueous solution of Natrosol 250 MHR (hydroxyethylcellulose thickener; Hercules, Inc.), 0.22 grams of Foamaster AP (defoamer; Diamond Shamrock Chemical Co.) and this mixture was added to the latex and equilibrated overnight. Just prior to drawing films, the peroxide and cobalt (if used) were added and the formulation was thoroughly mixed.

Thin films were drawn down on B-1000 steel panels and glass slides using a 15 mil gate to give dried films in the thickness range of 2–3 mils. Films were cured under ambient conditions on the laboratory benchtop for the duration of the tests.

| Films | Peroxide (5%) | Cobalt (0.1%) | MEK Rubs 1/7 day | Thin Film Swell Ratios 1/7 day |
|---|---|---|---|---|
| BL | none | Intercar[22] | 9/8 | 6.9/10 |
| BM | t-butyl hydroperoxide | Intercar | 63/58 | 25/7.7 |
| BN | cumene hydroperoxide | Intercar | 59/94 | 4.6/4.9 |
| BO | t-butyl hydroperoxide | napthenate | 47/36 | 10.4/9.6 |
| BP | cumene hydroperoxide | napthenate | 101/125 | 5.8/3.4 |

[22]a 6% water dispersible cobalt formulation; Akzo.

This demonstrates cure using peroxide with cobalt showing improvement over the comparative BL.

EXAMPLE 17

A polymer (Polymer 22) was prepared from a monomer mixture that contained 333 grams of water, 1.2 grams of Alipal CO-436 (an ammonium salt of sulfated nonylphenoxypoly (ethyleneoxy) ethanol; GAF Corp.), 1.0 grams acetic acid, 1.1 grams sodium acetate, 1429 grams of vinyl acetate, 48.1 grams of allyl acetoacetate and 14.3 grams of sodium vinyl sulfonate. To a kettle containing 700 grams of water heated to 75° C. was added 2 grams of acetic acid followed by 40 grams of a 45% solids, 100 nm BA/MMA/ MAA latex polymer preform, 0.2 grams of sodium bisulfite dissolved in 10 grams of water and 0.44 grams of sodium persulfate dissolved in ten grams of water and 11.5 grams of a 0.2% aqueous solution of iron (II) sulfate. Two separate catalyst feeds were made from 1.6 grams of t-butyl hydroperoxide, 1.2 grams of sodium persulfate dissolved in 80 grams of water and one with 1.8 grams of sodium bisulfite dissolved in 82 grams of water. The monomer emulsion and catalysts were then separately added over a two and one-half hour period. The latex was then cooled to ambient temperature.

The latex was neutralized to pH=9 with ammonium hydroxide (28% solution). An additives mix consisting of 1.5 grams of Triton X-405 (a 70% aqueous solution; Union Carbide Corp.), 6.75 grams of diisopropyladipate, 6.75 grams of propylene glycol, 8.0 grams of a 2% aqueous solution of Natrosol 250 MHR (hydroxyethylcellulose thickener; Hercules) and 7.5 grams of water was added to 150 grams of the latex. After 24 hours, the pH of the mixture was readjusted to 9.5. To 20 gram aliquots of this formulated material was added the materials listed in the Table below and the final formulations were equilibrated overnight before film application as described in Example 1.

| Film | Additional Additives | MEK Rubs | | | |
|---|---|---|---|---|---|
| | | 1 day | 7 day | 14 day | 28 day |
| BQ | None | 10 | 20 | 36 | 46 |
| BR | cobalt[19], 0.13 g | 23 | 33 | 30 | 46 |
| BS | Co + 0.24 g. linoleic acid | 17 | 43 | 70 | 85 |
| BT | Co + 0.24 g. sorbic acid | 18 | 35 | >100 | >100 |

This series of experiments demonstrates that vinyl acetate/allyl acetoacetate copolymer can be used in the invention (BS and BT) and produces improved cure over comparative films BQ and BR.

EXAMPLE 18

Latex Polymer 12 is identical to that used in Example 8.

Latex Polymer 23 was made by a similar procedure to polymer 12 except that the monomers used were 99.3 grams of allyl acetoacetate, 722.47 grams of butyl acrylate, 652.9 grams of methyl methacrylate, 19.42 grams of methacrylic acid and 2.99 grams of n-dodecylmercaptan.

Latex Polymer 24 was made by a similar procedure to polymer 12 except that the monomers used were 159.2 grams of acetoacetoxypropyl-methacrylate, 662.54 grams of butyl acrylate, 652.9 grams of methyl methacrylate, 19.42 grams of methacrylic acid and 2.99 grams of n-dodecylmercaptan.

Formulations were made in an identical manner as in Example 16 with the autoxidizable component consisting of 1.3 grams of linoleic acid.

| Film | Polymer | Thin Film Swell Ratio | |
|---|---|---|---|
| | | 1 day | 28 day |
| BU | 12 | 13 | 3.4 |
| BV | 23 | 14 | 6.8 |
| BW | 24 | 12 | 3.6 |

This demonstrates the use of the allyl acetoacetate and acetoacetoxypropylmethacrylate in the invention.

EXAMPLE 19

A polymer was prepared according to the procedure in Example 5, identified below as Polymer 8. A second polymer (25) was prepared according to the same procedure from a monomer mixture that contained 1479.6 grams of water, 5.1 grams of a 23% solution of sodium dodecyl benzene sulfonate, 1148.9 grams of ethyl acrylate, 707.2 grams of methyl methacrylate, 25.8 grams of methacrylic acid and 99.0 grams of acetoacetoxyethyl methacrylate.

A third polymer (26) was prepared from a monomer mixture that contained 1479.6 grams of water, 5.1 grams of a 23% solution of sodium dodecyl benzene sulfonate, 1228 grams of ethyl acrylate, 727 grams of methyl methacrylate and 25.8 grams of methacrylic acid.

To 3 15.8 grams of latex neutralized with ammonium hydroxide to pH 9.5, was added: 45.6 grams of butyl cellosolve, 4.8 grams of Texanol (coaleseent; Texaco), 0.5 grams of Deefo 806–102 (defoamer; Ultra Adhesives), 0.6 grams of BYK 301 (mar aid; BYK-Mallinekrodt), 0.6 grams of Dow Coming Additive #14 (flow and leveling aid; Dow Coming Corp.), 28.5 grams of water, 0.6 grams of methyl ethyl ketone oxime (Exkin #2; Nuodex, Inc.) and, where noted, the autoxidative material (3.6 grams of linoleie acid). The pH was readjusted to 8.1 with ammonium hydroxide (28%). This was tumbled overnight before 2.0 grams of cobalt (Interear, a 6% water dispersible formulation; Akzo) was added. In a separate grind, 5.4 grams of Tamol 165 (dispersant; Rohm and Haas), 16.4 grams of water, 0.7 grams of Triton CF-10 (surfactant; Union Carbide Corp.), 1.0 grams of Deefo 806–102 and 80.0 grams of titanium dioxide (Zopaque RCL-9; SCM Corporation) was placed in a Cowles Dissolver at high speed for 20 minutes and then letdown with the latex mixture.

Thin films were drawn down on B-1000 steel panels and glass slides and black vinyl sheet using an 8 mil gate to give dried films in the thickness range of 1–1.5 mils. Films were cured under ambient conditions at 70° C. at 50% relative humidity for the duration of the tests.

| Film | Polymer | Additive | 7 days Swell Ratio | Print | Block | 28 days Swell Ratio | Print | Block |
|---|---|---|---|---|---|---|---|---|
| BW | 26 | None | soluble | 2 | 0 | soluble | 4 | 0 |
| BX | 25 | None | 9.5 | 3 | 1 | 8.1 | 4 | 3 |
| BY | 8 | None | 5.5 | 4 | 1 | 6.1 | 5 | 3 |
| BZ | 26 | Linoleic Acid | gel | 1 | 0 | gel | 4 | 2 |
| CA | 25 | Linoleic Acid | 4.1 | 4 | 1 | 3.6 | 6 | 3 |
| CB | 8 | Linoleic Acid | 2.9 | 5 | 1 | 2.5 | 6 | 3 |

Comparative examples BW, BX, BY and BZ exhibited poor properties. The films according to the invention CA and CB demonstrate cure in fully formulated, pigmented coatings.

EXAMPLE 20

Polymers 26 and 8 from Example 19 were formulated as in Example 19 except where noted below. Films were cured under ambient conditions at 70° C. at 50% relative humidity for one month.

| Film | Polymer | Additive | Swell Ratio MEK | Print | Block | Abrasive Scrub mg/100 cycles | MEK Rubs |
|---|---|---|---|---|---|---|---|
| CC | 26 | Linoleic Acid | soluble | 1 | 0 | 22 | 12 |
| CD | 8 | None | 4.6 | 7 | 1 | 5.3 | 25 |
| CE | 8 | Linoleic Acid | 2.9 | 9 | 5 | 6.6 | 90 |

| Heat Aged Paints (140° F. for 10 days) then 1 month air cure | | | | | | | |
|---|---|---|---|---|---|---|---|
| CF | 26 | Linoleic Acid | soluble | 1 | 0 | 16.4 | 10 |
| CG | 8 | None | 5.4 | 7 | 2 | 5.7 | 25 |
| CH | 8 | Linoleic Acid | 3.2 | 8 | 4 | 6.7 | 70 |

Films CE and CH exhibit the improved cure properties of the invention versus the examples that are missing an element of the invention (CC, CD, CF and CG). Film CH demonstrates one-pack heat aged stability.

EXAMPLE 21

A two stage polymer (Polymer 27) was prepared with the first stage monomer mixture containing 121.5 grams of water, 9.78 grams of a 23% solution of sodium dodecyl benzene sulfonate, 243.5 grams of butyl acrylate, 289.6 grams of methyl methacrylate, 2.7 grams of methacrylic acid, and 5.4 grams of allyl methacrylate. From this monomer emulsion mixture, 100 grams was removed and added to a kettle containing a mixture of 1465 grams of water, and 46.9 grams of a 23% solution of sodium dodecyl benzene sulfonate heated to 85° C. An initiator charge of 1.35 grams of ammonium persulfate dissolved in 20 grams of water was added. Starting ten minutes later, two solutions were gradually fed to the kettle over a 90 minute period; the remaining monomer emulsion in one feed, and 2.0 grams of ammonium persulfate dissolved in 50 grams of water in a separate feed. After a ten minute hold, a second stage monomer mixture consisting of 260 grams of water, 22.82 grams of a 23% solution of sodium dodecyl benzene sulfonate, 422.0 grams of butyl acrylate, 557.8 grams of methyl methacrylate, 189.4 grams acetoacetoxyethyl methacrylate, 31.6 grams of methacrylic acid, 5.0 grams of methylmercaptopropionate and 42.1 grams of a ureido-functional methacrylate was added over a 90 minute period along with 0.9 grams of sodium persulfate dissolved in 50 grams of water in a separate feed. After the feeds were completed, the reaction was held at 85° C. for 20 minutes before the emulsion was cooled to 60° C. and chased by adding 0.2 gram of t-butyl hydroperoxide dissolved in 10 grams of water followed by 0.5 grams of isoascorbic acid dissolved in 16 grams of water.

The latex was then cooled to ambient temperature.

Following the same procedure, a second polymer (Polymer 28) was made that contained a second stage monomer mixture consisting of 260 grams of water, 22.82 grams of a 23% solution of sodium dodecyl benzene sulfonate, 536.7 grams of butyl acrylate, 652.4 grams of methyl methacrylate, 31.6 grams of methacrylic acid, 5.0 grams of methyl mercaptopropionate and 42.1 grams of a ureido-functional methacrylate.

Standard paint formulation is as follows, 72 grams of propylene glycol, 13.92 grams of Tamol 731 (a 25% aqueous dispersant solution; Rohm and Haas) 1 gram of Foamaster VL (defoamer; Diamond Shamrock Chemical Co.), 267.64 grams of titanium dioxide (Ti-Pure R-900; Dupont) and 5 grams of water. These are mixed, then ground in a Cowles Dissolver at high speed for 20 minutes and letdown as in the following order: 10 grams of water, 543 grams of the latex (neutralized to pH 9.5 with ammonium hydroxide), 7.3 grams of linoleic acid, 25.0 grams of Texanol (coalescent; Texaco), 10 grams of water, 1.8 grams of Kathon LX (biocide; Rohm and Haas), 1 grams of Foamaster VL, 4.9 grams of Aquacat (a 5% water dispersible cobalt formulation; Ultra Adhesives, Inc.), 4.9 grams of Magnacat (a 5% water dispersible manganese solution; Ultra Adhesives, Inc.), 71 grams of water, 1.6 grams of Acrysol RM-5 (thickener; Rohm and Haas) and 30 grams of RM-1020 (thickener; Rohm and Haas). These mixtures were equilibrated overnight before films were applied and cured at 70° C. at 50% relative humidity.

| Film | Polymer | Block 28 day | Print 28 day |
| --- | --- | --- | --- |
| CI | 27 - with AAEM | 7 | 8 |
| CJ | Comparative 28 - no AAEM | 2 | 4 |

The acetoacetate functional polymer (CI) showed better block and print performance.

EXAMPLE 22

A polymer (Polymer 29) was prepared from a monomer mixture that contained 192 g of acetoacetoxyethyl methacrylate and 288 g of butyl methacrylate. This was added to a kettle containing 320 g of xylene heated to 105° C. over a two hour period along with a separate feed containing 21.6 g of a 70% solution of t-butyl peroctoate. After the feeds were complete, the reaction was held at 105° C. for thirty minutes, chased with 2 g of the t-butyl peroctoate solution and held for 30 more minutes before cooling.

A second polymer (Polymer 30) was prepared following the same procedure except that the monomer solution contained only 480 g of butyl methacrylate.

To the polymers was added 0.1 wt. % of cobalt (Intercar, a 6% water dispersible formulation; Akzo) and the autoxidizable component listed in the table below. Films were made from these mixtures on glass slides and cured at ambient conditions for seven days. Swell ratios in methyl ethyl ketone were determined.

| | Film Swell Ratios (7 days) | |
| --- | --- | --- |
| Polymer: | 30 | 29 |
| Additive (wt. %) | Comparatives | |
| None - Comparative | dissolve | dissolve |
| Ethyl linoleate 10% | dissolve | 2.5 |
| PAGE 3% | dissolve | 5.0 |
| PAGE 15% | dissolve | 5.2 |
| Raw Linseed Oil 10% | dissolve | 3.7 |

[20]polyallyglycidylether, Santolink XI-100; Monsanto.

The compositions within the invention showed improved performance over the comparative examples which dissolved.

EXAMPLE 23

A polymer (Polymer 31) was prepared from a monomer mixture that contained 253.8 grams of water, 9.0 grams of a 23% solution of sodium dodecyl benzene sulfonate, 53 1.3 grams of butyl acrylate, 270.0 grams of methyl methacrylate, 12.9 grams of methacrylic acid, 42.9 grams of acetoacetoxyethyl methacrylate, 1.71 grams of n-dodecyl mercaptan. From this monomer emulsion mixture, 20 grams was removed and added to a kettle containing a mixture of 703.4 grams of water and 5.5 grams of a 23% solution of sodium dodecyl benzene sulfonate heated to 85° C. An initiator charge of 2.52 grams of sodium persulfate dissolved in 42.0 grams of water was added. Starting ten minutes later, the remaining monomer emulsion was gradually added over a two hour period. After the two hour period, the emulsion was cooled to 60° C. at which point 0.4 gram of t-butyl hydroperoxide dissolved in 8.0 grams of water was added followed by 0.5 grams of sodium formaldehyde sulfoxylate dissolved in 8.0 grams of water. The latex was then cooled to ambient temperature.

A polymer (Polymer 32) was prepared from a monomer mixture that contained 106.8 grams of water, 3.8 grams of a 23% solution of sodium dodecyl benzene sulfonate, 198.5 grams of butyl acrylate, 84.8 grams of methyl methacrylate, 5.4 grams of methacrylic acid, 72.2 grams of acetoacetoxyethyl methacrylate, 0.72 grams of n-dodecyl mercaptan. From this monomer emulsion mixture, 20 grams was removed and added to a kettle containing a mixture of 296.2 grams of water and 2.3 grams of a 23% solution of sodium dodecyl benzene sulfonate heated to 85° C. An initiator charge of 1.06 grams of sodium persulfate dissolved in 17.7 grams of water was added. Starting ten minutes later, the remaining monomer emulsion was gradually added over a two hour period. After the two hour period, the emulsion was cooled to 60° C. at which point 0.17 gram of t-butyl hydroperoxide dissolved in 3.37 grams of water was added followed by 0.21 grams of sodium formaldehyde bisulfite dissolved in 3.37 grams of water. The latex was then cooled to ambient temperature.

To 50 grams of the latex (neutralized to pH 9.5 with ammonium hydroxide) was added 0.5 grams of Triton X-405 (a 70% aqueous solution; Union Carbide Corp.), 2.2 grams of diisopropyladipate, 2.2 grams of propylene glycol, 1.25 grams of a 2% aqueous solution of Natrosol 250 MHR (hydroxyethylcellulose thickener), and ammonium hydroxide to raise the pH to 9.0. The materials listed in the table were also added: 0.2 grams of cobalt (Intercar, a 6% water dispersible formulation; Akzo) and 0.68 grams of linoleic acid and the formulated mixtures were equilibrated overnight. Films were applied to glass panels using a 15 mil gate, air dried under ambient conditions for one hour, then baked in a 150° C. oven for the differing times listed in the Table.

| | | | MEK Rubs | | | |
| --- | --- | --- | --- | --- | --- | --- |
| Film | Polymer | Additives | 0 min[21] | 5 min | 10 min | 20 min |
| CK | 31 | None | 3 | 3 | 5 | 5 |
| CL | 31 | Cobalt | 3 | 27 | 32 | 19 |
| CM | 32 | Cobalt | 5 | — | 85 | >100 |
| CN | 32 | Cobalt/ Linoleic Acid | 5 | >100 | >100 | >100 |

Film CN demonstrates the rapid achievement of cure in a heat accelerated experiment. Comparative films CK, CL and CM developed cure more slowly.

EXAMPLE 24

A polymer (Polymer 33) was prepared from a monomer mixture containing 346.6 grams of acetoacetoxyethylmethacrylate and 187.9 grams of 2-hydroxyethyl acrylate. This was added over a two hour period to a kettle containing 232.1 grams of butyl cellosolve heated to 105° C. along with 7.2 grams of t-butyl peroctoate dissolved in 7.0 grams of butyl cellosolve. After two hours, 0.72 grams of t-butyl peroctoate was added and the heating continued for thirty minutes. Another 0.72 grams of t-butyl peroctoate was added and the heating continued for thirty minutes before the polymer solution was cooled.

To 10.7 grams of the polymer was added 1.15 grams of a 28% solution of ammonium hydroxide and the unsaturated fatty mine listed in the table. This mixture was diluted with water to provide a 32% solids solution. This was poured into a petri dish and cured under ambient conditions.

| Film | Additional Additives | Swell Ratio 14 days |
| --- | --- | --- |
| CO | None | dissolves |
| CP | Soya oil primary amine[23] (0.57 grams) | 2.8 |
| CQ | Tall oil primary amine[24] (0.60 grams) | 2.4 |

Films CP and CQ demonstrate cure of a water dispersible solution polymer according to the invention.

EXAMPLE 25

An alkali soluble polymer was prepared from a monomer mixture that contained 726.9 grams of water, 32.1 grams of sodium lauryl sulfate (28% aqueous solution), 810 grams of butyl acrylate, 360 grams of methacrylic acid, 630 grams of acetoacetoxyethyl methacrylate, 54 grams of n-dodecyl mercaptan. From this monomer emulsion mixture, 80 grams was removed and added to a kettle containing a mixture of 1153.7 grams of water, 9.0 grams of sodium acetate and 64.3 grams of sodium lauryl sulfate (28% aqueous solution) heated to 82° C. An initiator charge of 3.60 grams of sodium persulfate dissolved in 50.0 grams of water was added. Starting ten minutes later, the remaining monomer emulsion was gradually added over a three hour period along with 2.70 grams of sodium persulfate dissolved in 50 grams of water in a separate feed. After the three hour period, the emulsion was cooled to 55° C. and chased by adding 5.0 grams of a 0.15% aqueous solution of iron (II) sulfate and 1.0 gram of t-butyl hydroperoxide dissolved in 10.0 grams of water followed by 0.5 grams of isoascorbic acid dissolved in 20 grams of water. After 20 minutes, 15.0 grams of 10% hydrogen peroxide in 10.0 grams of water was added. This was repeated 20 minutes later. The latex was then cooled to ambient temperature.

The latex (Polymer 1) was first neutralized with ammonia to pH=9.5 (acetoacetate all converted to the corresponding enamine). Then, to 100 grams of the latex was added the alkali soluble resin in the amounts listed in the Table and the pH was readjusted after 24 hours with ammonia to pH=9.5. This polymer blend was then added to a mixture consisting of 4.1 grams of propylene glycol, 4.1 grams of diisopropyladipate, 0.29 grams of Triton X-405 (a 70% aqueous solution of polyethoxylated nonylphenol, Union Carbide Corp.), 5.11 grams of a 2% aqueous solution of Natrosol 250 MHR (hydroxyethylcellulose; Hercules Inc.), 0.68 grams of cobalt (Intercar, a 6% water dispersible solution; Akzo), 0.12 grams of methyl ethyl ketone oxime, 1.23 grams of linoleic acid and 0.02 grams of Foamaster AP (defoamer; Diamond Shamrock Chemical Co). This formulated mixture was equilibrated overnight prior to film application as illustrated in Example 1.

| Film | Alkali Soluble Resin wt. % | Swell Ratio | MEK Rubs |
| --- | --- | --- | --- |
| CR | 0 | 3.4 | 55 |
| CS | 3 | 3.3 | 115 |
| CT | 6 | 3.5 | 150 |
| CU | 10 | 3.8 | 215 |

This demonstrates that a blend of a latex polymer and an alkali soluble polymer blend can be cured according to the invention.

EXAMPLE 26

A polymer was prepared from a monomer mixture that contained 509.2 grams of water, 23.1 grams of Alipal CO-436 (an ammonium salt of sulfated nonylphenoxypoly (ethyleneoxy) ethanol; GAF Corp.), 23.5 grams of methacrylic acid, 1544.0 grams of acetoacetoxyethyl methacrylate, 3.1 grams of n-dodecyl mercaptan. From this monomer emulsion mixture, 49.1 grams was removed and added to a kettle containing a mixture of 1274.7 grams of water and 3.89 grams of Alipal CO-436 heated to 85° C. An initiator charge of 2.36 grams of sodium persulfate dissolved in 78.8 grams of water was added. Starting ten minutes later, the remaining monomer emulsion was gradually added over a two hour period along with 1.4 grams of sodium persulfate dissolved in 50 grams of water in a separate feed. After the two hour period, the emulsion was cooled to 60° C. and chased by adding 1.0 gram of t-butyl hydroperoxide dissolved in 13.1 grams of water followed by 0.5 grams of isoascorbic acid dissolved in 13.1 grams of water. The latex was then cooled to ambient temperature.

The polymer was neutralized and equilibrated to pH=9.5 with ammonia and the solid content of the solution was reduced to 25 wt. %. The additives listed in the Table were then added to 16 grams aliquots, mixed, and poured into petri dishes and cured at ambient temperatures.

| | Additive | Amount | Swell Ratio 7 days |
| --- | --- | --- | --- |
| CV | None | — | 11.4 |
| CW | Cobalt (Intercar) | 0.07 grams | 11.3 |
| CX | Cobalt (Intercar) + Linoleic acid | 0.07 grams 0.24 grams | 7.6 |

Film CX demonstrates the use of the invention in very high AAEM content polymer (98.5%).

We claim:

1. A self-crosslinking film-forming composition consisting essentially of a vinyl polymer containing pendant acetoacetate functionality and a polyunsaturated aerobic radical source which generates a free radical flux on exposure of the composition to oxygen, wherein said aerobic radical source is selected from the group consisting of drying oils, drying oil fatty acids, alkyd resins containing drying oils and simple esters of drying oil fatty acids, provided that said composition contains substantially no conventional polymerization initiator.

2. A film-forming composition according to claim 1 which further comprises a metal drier.

3. A film-forming composition according to claim 1 or 2 wherein said vinyl polymer containing pendant acetoacetate functionality is soluble in water or water-co-solvent mixtures.

4. A film-forming composition according to claim 1 or 2 wherein said vinyl polymer containing pendant acetoacetate functionality is prepared by emulsion or dispersion polymerization.

5. A film-forming composition according to claim 3 in which the pendant acetoacetate functionality has been converted to pendant enamine functionality by reaction with a molar excess of ammonia or a primary amine capable of enamine formation.

6. A composition according to claim 5 wherein the primary amine is selected from the group consisting of ethanolamine, methyl amine, isopropyl amine and mixtures thereof.

7. A film-forming composition according to claim 4 in which the pendant acetoacetate functionality has been converted to pendant enamine functionality by reaction with a molar excess of ammonia or a primary amine capable of enamine formation.

8. A composition according to claim 7 wherein the primary amine is selected from the group consisting of ethanolamine, methyl amine, isopropylamine and mixtures thereof.

9. A composition according to claim 1 or 2 wherein the pendant acetoacetate functionality is incorporated in the vinyl polymer by polymerization of a monomer selected from the group consisting of allyl acetoacetate, acetoacetoxyethyl methacrylate, acetoacetoxypropyl methacrylate, and acetoacetoxybutyl methacrylate.

10. A composition according to claim 9 wherein the vinyl polymer contains from 0.5 to 100 percent of the acetoacetate monomer by weight.

11. A composition according to claim 9 wherein the vinyl polymer contains from 1 to 40 percent of the acetoacetate monomer by weight.

12. A film-forming composition according to claim 1 or 2 wherein said vinyl polymer containing pendant acetoacetate functionality is a solution polymer in non-aqueous organic solvent.

13. A composition according to claim 1 or claim 2 wherein the drying oil fatty acid is from 0.5 to 6 wt % of the composition.

14. A composition according to claim 1 or 2 wherein the polyunsaturated aerobic radical source is a drying oil present at from 0.5 to 15 percent of the composition by weight.

15. A composition according to claim 1 or 2 where the vinyl polymer is a homopolymer or copolymer of acetoacetoxyethyl methacrylate or acrylate.

16. A composition according to claim 2 wherein the metal drier is incorporated at 0.01 to 1% metal content by weight.

17. A composition according to claim 16 wherein the metal drier is a cobalt salt.

* * * * *